United States Patent [19]
Udd

[11] Patent Number: 5,828,059
[45] Date of Patent: Oct. 27, 1998

[54] TRANSVERSE STRAIN MEASUREMENTS USING FIBER OPTIC GRATING BASED SENSORS

[76] Inventor: Eric Udd, 2555 NE. 205th Ave., Troutdale, Oreg. 97060

[21] Appl. No.: 707,861

[22] Filed: Sep. 9, 1996

[51] Int. Cl.⁶ .............................. G01B 11/16; G01K 11/32
[52] U.S. Cl. ....................................... 250/227.18; 356/32
[58] Field of Search ....................... 250/227.18, 227.23, 250/227.14, 227.21, 227.19, 227.32, 227.11; 356/32, 35.5, 345; 385/12, 13, 37, 123, 124; 73/800, 760, 763, 773, 774; 374/46, 120, 130, 131, 161, 162

[56] References Cited

U.S. PATENT DOCUMENTS

| | | | |
|---|---|---|---|
| 4,806,012 | 2/1989 | Meltz et al. | 356/32 |
| 4,915,468 | 4/1990 | Kim et al. | 385/123 |
| 4,996,419 | 2/1991 | Morey | 250/227.18 |
| 5,319,435 | 6/1994 | Melle et al. | 250/227.18 |
| 5,361,130 | 11/1994 | Kersey et al. | 250/227.27 |
| 5,380,995 | 1/1995 | Udd et al. | 250/227 |
| 5,399,854 | 3/1995 | Dunphy et al. | 250/227 |
| 5,426,297 | 6/1995 | Dunphy et al. | 250/227.23 |
| 5,493,113 | 2/1996 | Dunphy et al. | 250/227.14 |
| 5,591,965 | 1/1997 | Udd | 250/277.18 |
| 5,641,956 | 6/1997 | Vengsarkar et al. | 250/227.14 |
| 5,646,401 | 7/1997 | Udd | 250/227.18 |

FOREIGN PATENT DOCUMENTS

2264298  8/1993  United Kingdom .
WO 93/17314  9/1993  WIPO .

OTHER PUBLICATIONS

Wolinski, et al., "Polarimetric Fiber Optic Sensing for Smart Structures", Proc. of SPIE, vol. 2839, p. 265, 1996.
Udd, "Advanced Strain Measurement Applications of Fiber Optic Grating Sensors", Proc. of SPIE, vol. 2872, p. 18, 1996.
Craig Lawrence et al., "Multiparameter Sensing with Fiber Bragg Gratings", Proc. of SPIE, vol. 2872, p. 24, 1996.

*Primary Examiner*—Edward P. Westin
*Assistant Examiner*—John R. Lee
*Attorney, Agent, or Firm*—George W. Finch

[57] ABSTRACT

A system and method to sense the application of transverse stress to an optical fiber which includes a light source that producing a relatively wide spectrum light beam. The light beam is reflected or transmitted off of an optical grating in the core of an optical fiber that is transversely stressed either directly or by the exposure to pressure when the fiber is bifringent so that the optical fiber responds to the pressure to transversely stress its core. When transversely stressed, the optical grating produces a reflection or transmission from the light beam that has two peaks or minimums in its frequency spectrum whose spacing and/or spread are indicative of the forces applied to the fiber. One or more detectors sense the reflection or transmissions from the optical grating to produce an output representative of the applied force. Multiple optical gratings and detectors may be employed to simultaneously measure temperature or the forces at different locations along the fiber.

25 Claims, 10 Drawing Sheets

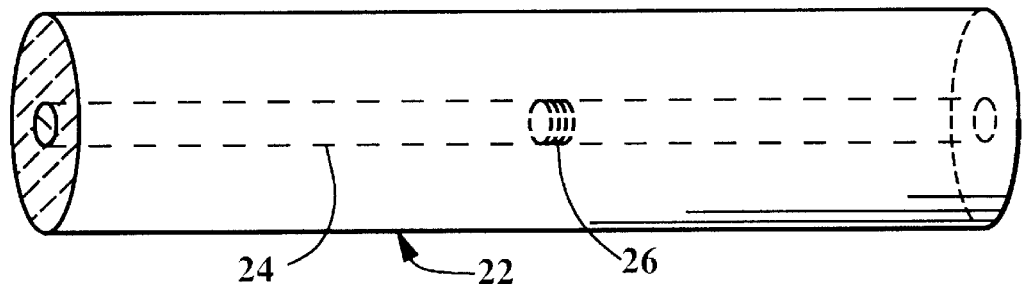
Fig. 1
Fig. 2
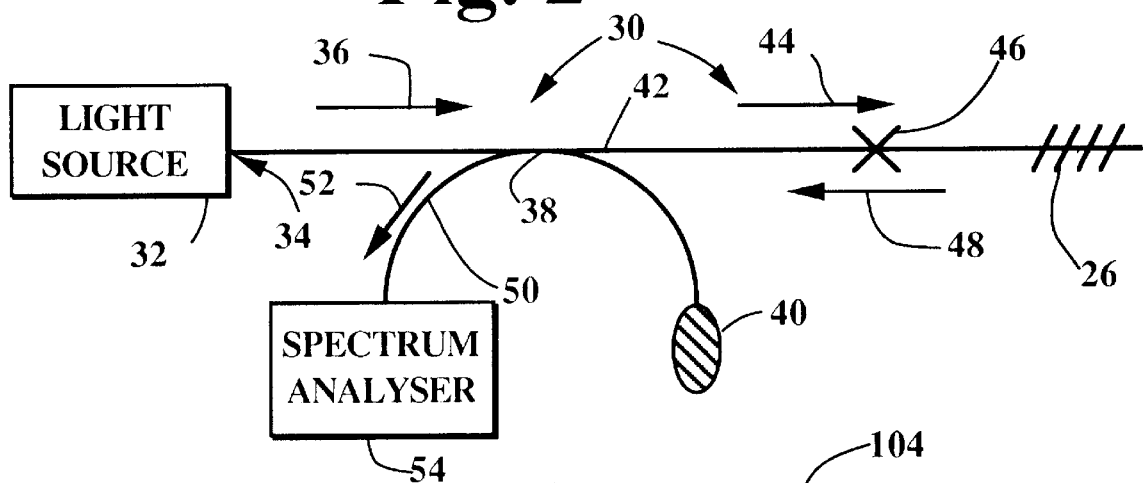
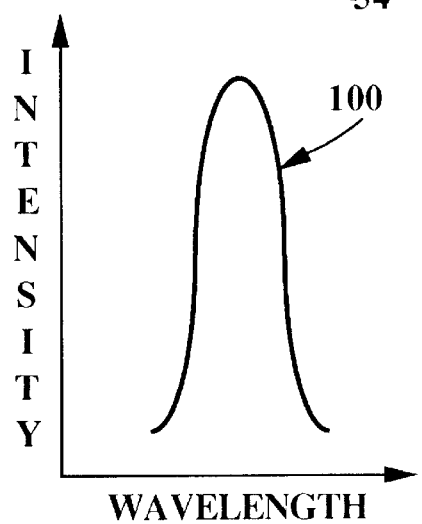
Fig. 3A
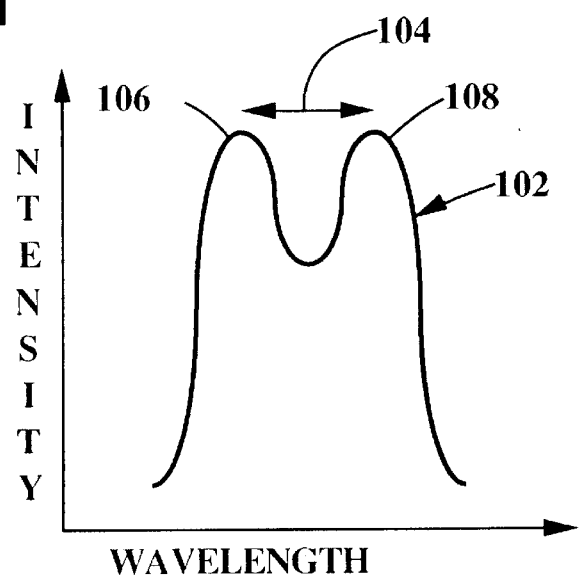
Fig. 3B

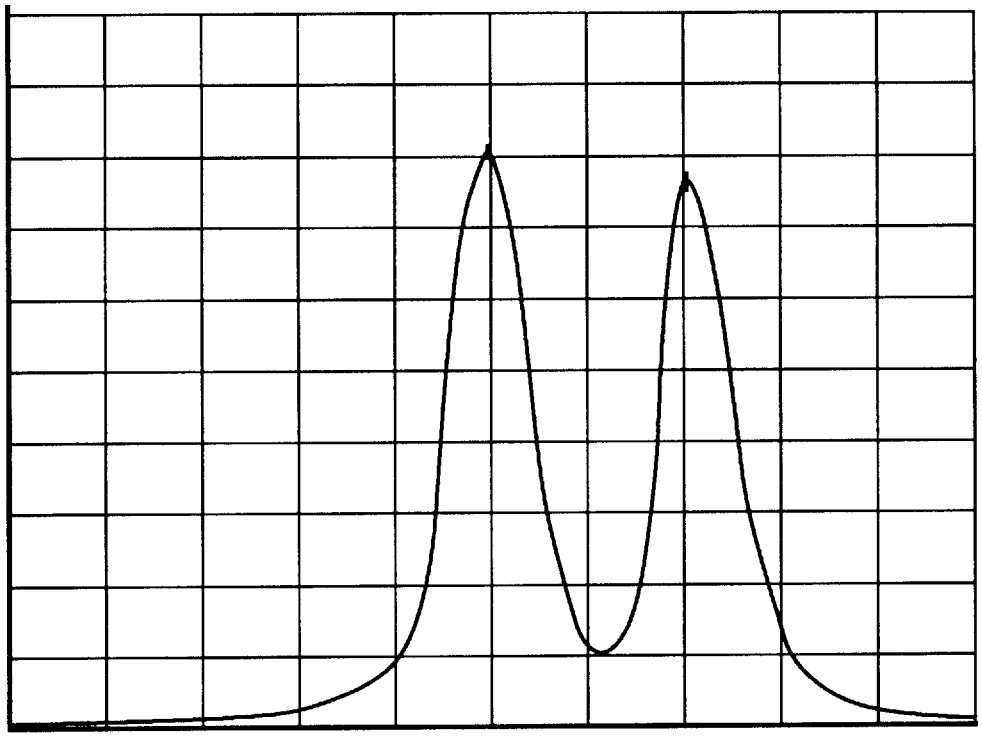
CENTER 1383.459 nm          SPAN 2.000nm
Fig. 7A
Fig. 7B
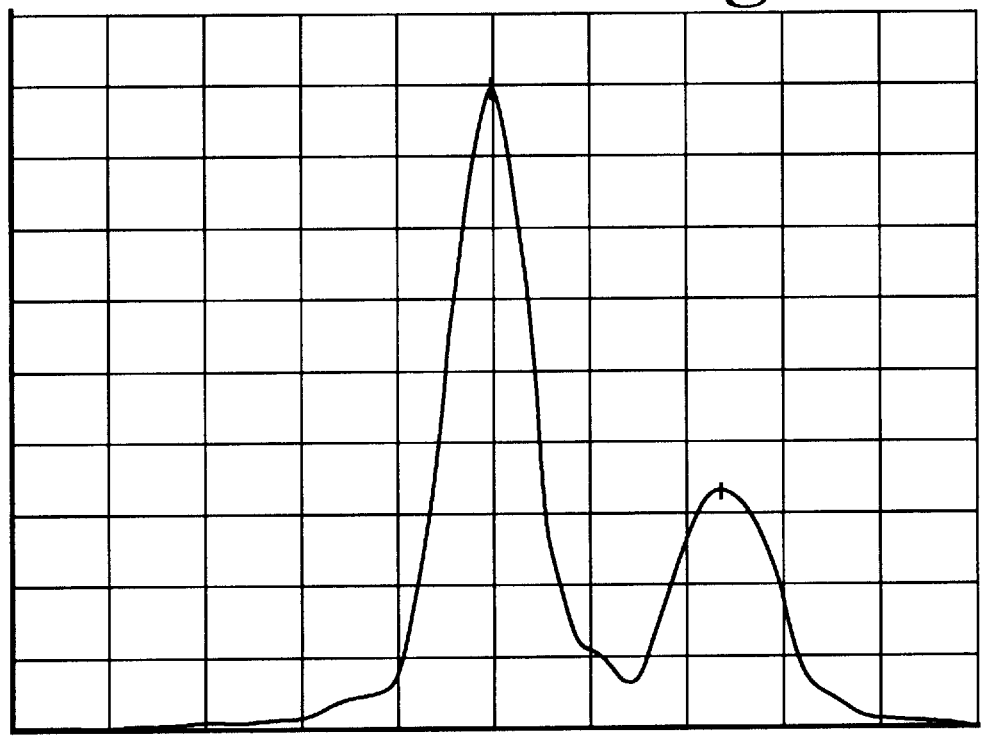
CENTER 1548.542 nm          SPAN 2.000nm

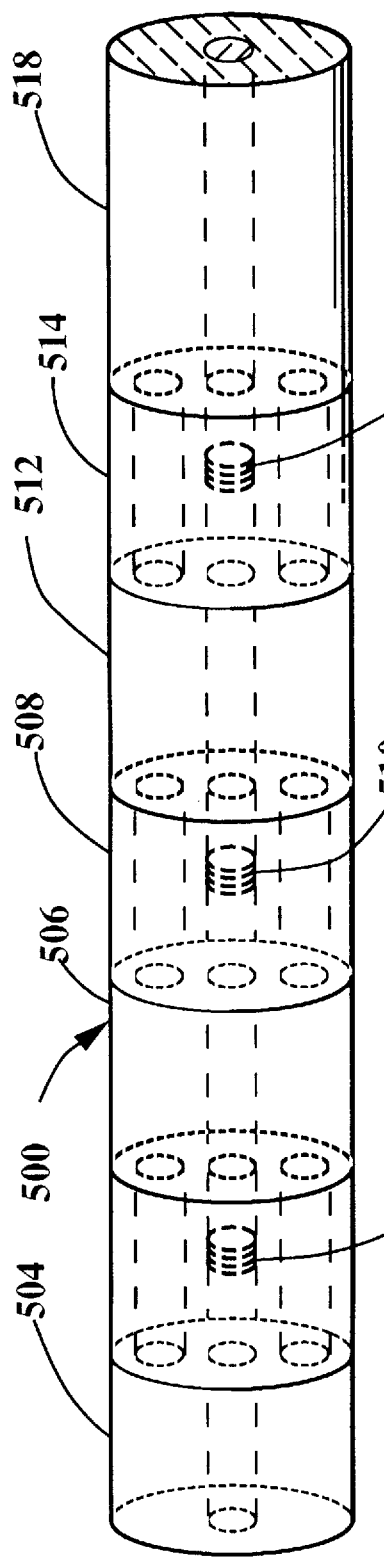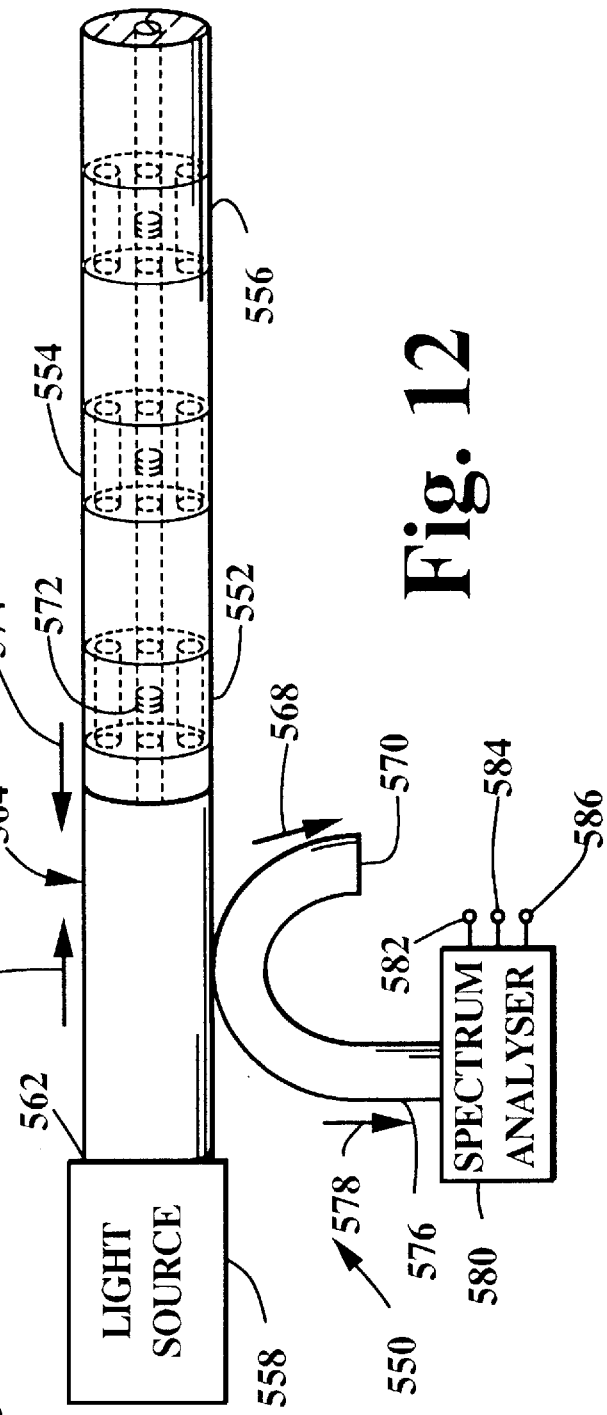

CENTER 1546.397 nm    SPAN 2.000nm

CENTER 1547.142 nm    SPAN 2.000nm

CENTER 1547.847 nm          SPAN 2.000nm

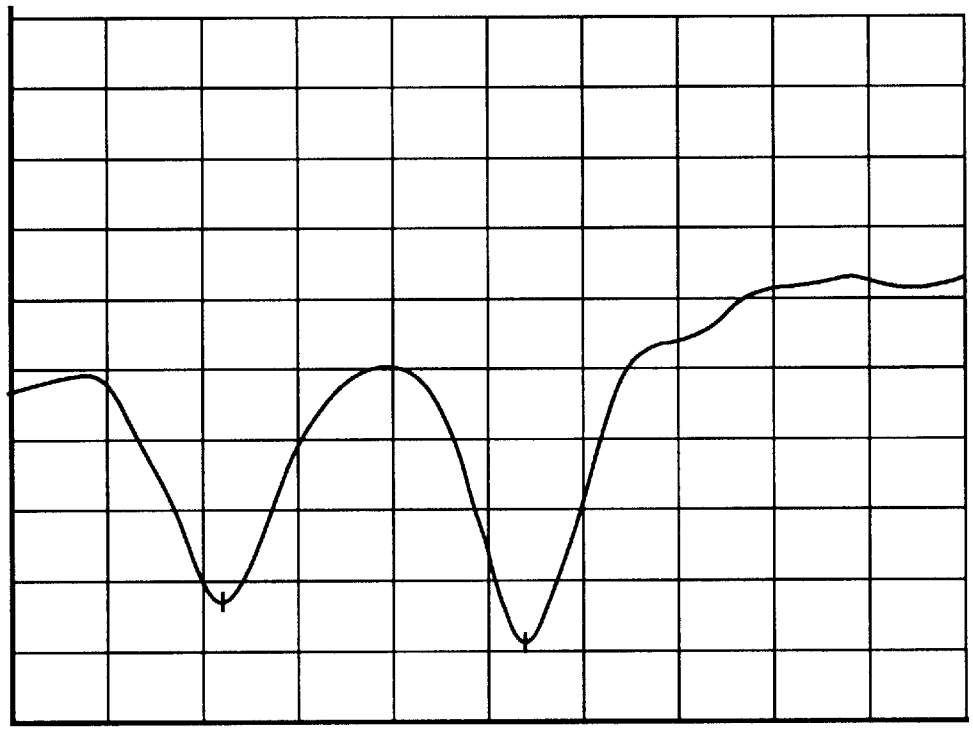
CENTER 1300.000 nm  SPAN 5.000nm
Fig. 20A
Fig. 20B
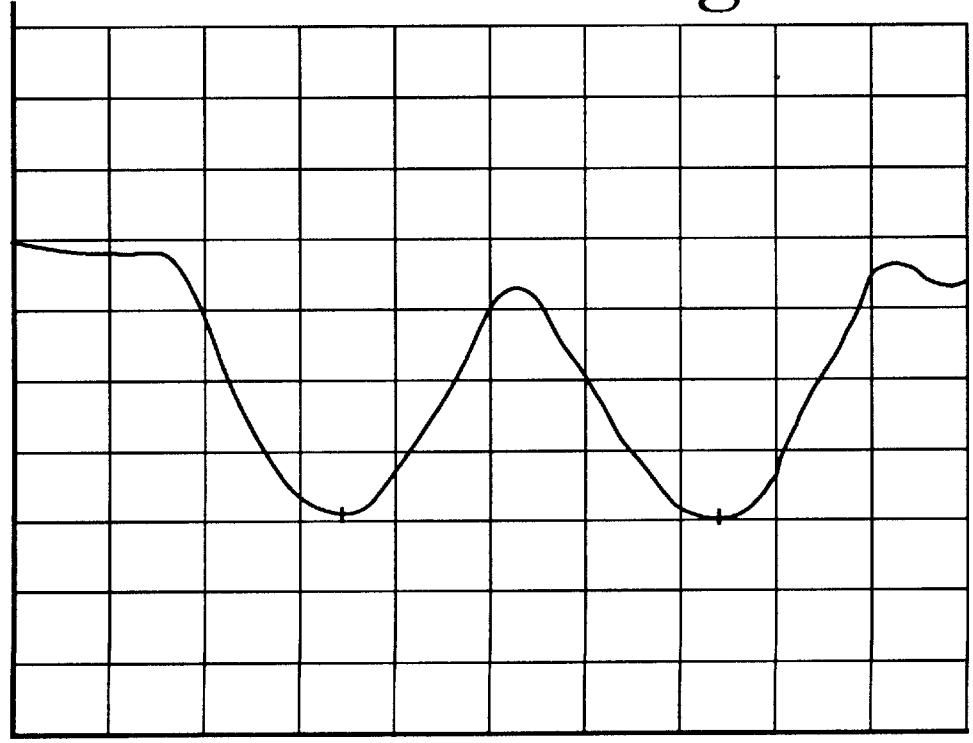
CENTER 1549.200 nm  SPAN 1.000nm

TRANSVERSE STRAIN MEASUREMENTS USING FIBER OPTIC GRATING BASED SENSORS

This invention was made with Government support under contract NAS1-20638 awarded by NASA. The Government has certain rights to this invention.

BACKGROUND OF THE INVENTION

There is a need for an accurate and responsive environmental sensor system to measure transverse strain and transverse strain gradients. There is also a need for pressure sensors that are based on transverse strain measurements that are nearly temperature independent and or can be temperature compensated. Applications of this type of transverse sensor system would include the location, identification and measurement of a transverse strain in an aircraft or space structure. These structures in order to perform their mission must be able to provide a continuous indication of their status in real time including transverse strain loading. Nearly temperature independent or temperature compensated fiber grating pressure sensors based on transverse strain could be used to measure pressure in liquid oxygen and hydrogen tanks as well as other hazardous areas. Civil structure applications of these sensors would include the measurement of transverse strain throughout a bridge, building or highway structure as well as transverse loading of the roofs of mines. These sensors could also be used to support systems that could be used to identify structural damage to residential and business building after a disaster such as an earthquake or hurricane. Pressure sensors could be used for a variety of industrial applications including process control of foods and chemicals.

Other applications for these sensors include the emerging area of smart structures where sensors are used to monitor environmental parameters that are used to augment manufacturing, perform nondestructive evaluation, implement health monitoring systems for structures and augment control systems. These structures need to be able to continuously monitor their condition in real time. They must be able to operate over extremely long times with low power. The sensors used to support these structures must be capable of accurately measuring small changes in environmental signals and still be able to maintain wide dynamic range capabilities.

Fiber optic gratings have been proposed for fiber optic sensors that have the potential to meet many of these requirements. The fiber gratings are constructed by doping the core of an optical fiber with material such as germania. When exposed to light the index of refraction of the optical core of silica based fiber with appropriate core dopants have been observed to have a modified index of refraction. By using phase masks or interfering laser beams it has been demonstrated that it is possible to produce multiple variations in the index of refraction along the length of the fiber core producing an internal grating structure. Adjusting the spacing of the period during formation of the fiber grating changes its spectral transmission and reflection characteristics.

When a fiber grating is exposed to an environmental effect such as strain, temperature, pressure, or vibration the length of the optical fiber is changed and consequently the period of the fiber grating. As an example W. W. Morey reports in "Distributed Fiber Grating Sensors", Proceedings of the Seventh Optical Fiber Sensors Conference, p. 285–288, Sydney, Australia, December 1990 that typical temperature changes are 0.0043 nm/degree C. at 833 nm for Andrew PM fiber and 0.0074 nm/degree C. for Corning FlexCore fiber at 824 nm. When the fiber is strained the length of the fiber also changes. Bragg wavelength changes were measured by Morey to result in a shift of $5.2 \times 10\text{-}4$ nm per microstrain at 820 nm.

For many applications it is necessary to measure both temperature and strain simultaneously. E. Udd and T. E. Clark, in "Fiber Optic Grating Sensor Systems for Sensing Environmental Effects", U.S. Pat. No. 5,380,995 describe how using two overlaid fiber gratings at different wavelengths such as 1.3 and 1.5 microns may be used to measure two environmental parameters such as strain and temperature at a single point. Recently M. G. Xu, H. Geiger and J. P. Dakin, in "Multiplexed Point and Stepwise-Continuous Fiber Grating Based Sensors: Practical Sensor for Structural Monitoring?", Proceedings of SPIE, volume 2294, p. 69–80, 1994 have also demonstrated the simultaneous measurement of strain and temperature using 1.3 and 0.85 microns wavelengths and overlaid fiber gratings for point measurements. In order to make complete measurements of strain internal to a structure it is often necessary to measure all three strain components. R. M. Measures, D. Hogg, R. D. Turner, T. Valis and M. J. Giliberto, in "Structurally Integrated Fiber Optic Strain Rosette", Proceedings of SPIE, volume 986, p. 32–42, 1988 demonstrated a fiber optic strain rosette consisting of three separate fiber sensors. Because these fiber sensors are not collocated and because means to compensate for temperature fluctuation were not employed these rosettes have been of very limited use. Eric Udd in U.S. Pat. No. 5,591,965, "Multiparameter Fiber Optic Grating System" describes a fiber grating sensor based on dual overlaid fiber gratings written onto birefringent fiber that allows three axes of strain and temperature to be measured including transverse strain. There is however a continuing need to improve and refine transverse strain measurement capability as well as support measurement of pressure and strain gradients.

BRIEF DESCRIPTION OF THE PRESENT INVENTION

In the present invention, a fiber grating is written onto single mode optical fiber to form a transverse strain sensor. When the fiber is ordinary single mode fiber, transverse strain applied to the fiber results in a splitting of the fiber grating spectral profile into two peaks. Measurement of the spectral separation between these two peaks can be made to indicate the amount of transverse loading of the fiber. This approach is useful when the orientation of the fiber grating transverse sensor is unknown with respect to the direction of the applied loading. As an example this might be the case when the fiber grating transverse sensors are placed in a pultruded beams used to support and make measurements on the roof of a mine shaft. For small transverse loads however the spectral peaks are very close together making it difficult to make an accurate measurement of peak to peak separation. By writing the fiber grating onto birefringent optical fiber such as polarization preserving fibers with elliptical cores, or claddings that induce stress birefringence a clear separation between spectral peaks is possible and accurate measurements can be made for very small changes in transverse loading. For non-symmetric fiber cladding, such as those involving elliptical claddings or side air holes, changes in pressure will induce changes in transverse strain. When a fiber grating is written onto the core of this type of fiber it may be used to form a fiber pressure sensor. Since the spectral separation between the two stress induced peaks is small, the change in peak to peak separation due to temperature will be small. However, overall spectral shift of the peaks will respond to strain and temperature in a manner similar to that of an ordinary fiber grating and can be measured using dual overlaid fiber gratings as described by Udd and Clark.

The present system can be used to support multiple measurements of strain or pressure by using multiple fiber gratings operating at different wavelengths and or by using time division multiplexing techniques.

Therefore, it is an object of the invention to provide sensor systems consisting of a fiber grating written onto ordinary single mode fiber to measure transverse strain independent of load direction.

Another object of the invention is to provide an environmental sensor system capable of measuring the amplitude and position of a time varying environmental signal.

Another object of the invention is to provide a transverse strain sensor capable of measuring very small changes in transverse strain Another object of the invention is to measure pressure.

Another objection of the invention is to measure transverse strain gradients.

Another object of the invention is to measure transverse strain gradients and identify their orientation with respect to the axes of the optical fiber.

Another object of the invention is to provide a system that can measure transverse loading in mine shafts.

Another object of the invention is to provide multiple point pressure and temperature sensors for process control.

Another object of the invention is to provide both transverse strain and pressure/temperature measurements along a single optical fiber length.

Another object of the invention is to provide structural information on the integrity of dams in order to alert the user of the need to take corrective actions.

These and other objects and advantages of the present invention will become apparent to those skilled in the art after considering the following detailed specification and the accompanying sheets of drawings wherein:

BRIEF DESCRIPTION OF THE DRAWINGS

FIG. 1 is a diagram of a fiber grating written onto circularly symmetric single mode optical fiber.

FIG. 2 shows a basic fiber grating demodulation system configured to operate in the reflective mode.

FIG. 3A shows a profile of the reflected spectrum of a fiber grating written into circularly symmetric optical fiber without transverse loading and FIG. 3B shows a profile of the reflected spectrum of a fiber grating written into circularly symmetric optical fiber with transverse loading.

FIGS. 7A and 7B show the reflected spectrum from dual overlaid fiber gratings at 1300 and 1550 nm respectively written onto 3M polarization preserving birefringent fiber.

FIG. 11 shows a series of multiplexed fiber grating based pressure sensors in a single fiber line.

FIG. 12 shows a system that supports the demodulation of multiplexed fiber grating based pressure sensors.

FIGS. 20A and 20B show the spectral curves of a dual overlaid fiber grating written at 1300 and 1550 nm into birefringent polarization maintaining fiber.

DETAILED DESCRIPTION OF THE SHOWN EMBODIMENTS

Figure 4:
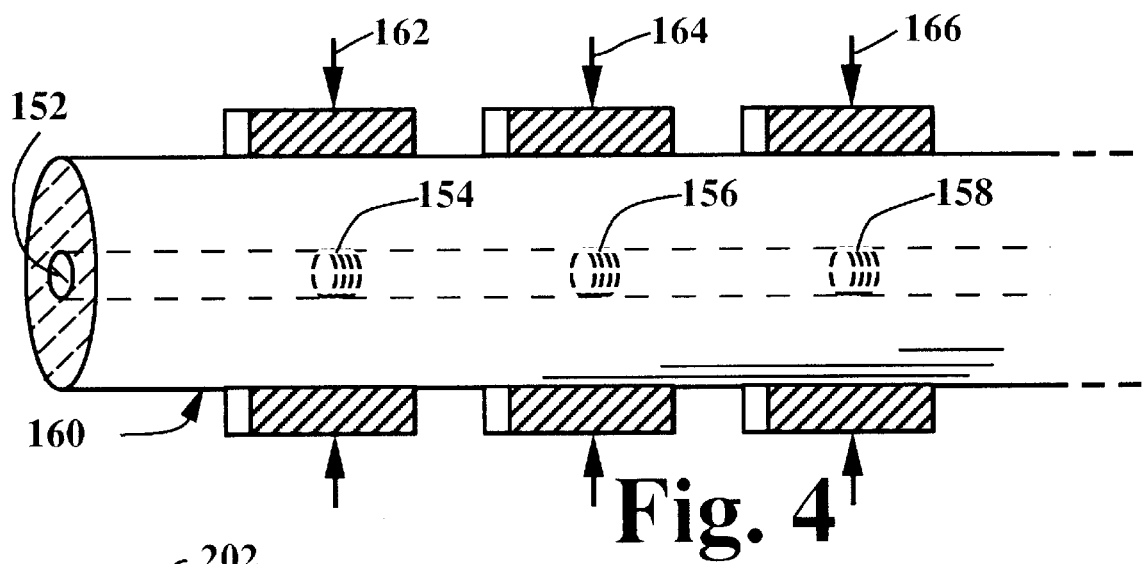
FIG. 4 illustrates multiplexed fiber gratings in an optical fiber that have been formed into a rod that is subject to transverse loading.

Referring to the drawings more particularly by reference numbers, 22 in FIG. 1 refers to a circularly symmetric length single mode optical fiber. Written onto the core 24 of the optical fiber is a fiber grating 26. When the fiber grating 26 is attached to a fiber grating demodulation system 30, as shown in FIG. 2, changes in the period of the fiber grating due to environmental changes such as strain and temperature may be determined by measuring spectral shifts in light reflected or transmitted through the fiber grating. In the case of the demodulation system shown in FIG. 2, a light source 32 that may be a broadband light source such as a light emitting diode or a relatively narrow band tunable light source, is used to couple light into the fiber end 34. The coupled light beam 36 is then directed through a beamsplitter, such as fiber beamsplitter 38. One port of the fiber beamsplitter 38 may be terminated with a non-reflecting end 40 or it could be used to support measurements on additional fiber gratings. A portion of the light beam 36 is split into an output port 42 of the beamsplitter 38 to become the light beam 44. The output port 42 is connected via a splice or connector 46 to the fiber grating 26. The portion 48 of the light beam 44 that is reflected by the fiber grating 26, is directed back to the beamsplitter 38 and a portion of it is directed into the beamsplitter port 50 as the light beam 52. This light beam 52 then enters the spectrum analyzer 54 that measures spectral shifts in the light beam 52 due to changes in the state of the fiber grating 26 induced by environmental effects.

FIG. 3A a shows the spectral reflection profile of the fiber grating 26 as determined by the spectral demodulator 54 when the fiber grating 26 is not subject to transverse stress. Note there is a single peak in the profile 100. This corresponds to the case when there is little if any induced birefringence. When transverse stress is applied to the fiber grating 26, the reflected profile 100 starts to split until there is a dual lob profile such as 102 shown in FIG. 3B. The amount of transverse stress is proportional to the induced birefringence which in turn determine the spectral separation 104 between the peaks 106 and 108.

To first order, the peak to peak separation 104 is relatively temperature independent because both peaks 106 and 108 are nearly at the same wavelength and temperature causes both peaks 106 and 108 to move in the same overall direction by nearly the same spectral shift. The approach of using fiber gratings written into circularly symmetric single mode optical fiber has the advantages of using has the advantages of using low cost telecommunication grade optical fiber and having transverse sensitivity that is independent of the loading direction. As an example of how this can be used, consider the case shown in FIG. 4 of a circularly symmetric optical fiber containing a series of fiber gratings 154, 156, 158, . . . that is placed into a position near the center of the rod 160 during fabrication. The fabrication may be accomplished by a process such as pultrusion. If the rod 160 is placed in a transverse load bearing structure, which might be a roof of a building, mine or tunnel, it will be subject to variations in transverse loads 162,164 and 166 along its length. These loads can then be measured by determining the peak to peak separation of the reflected spectral profiles of the fiber gratings 154,156 and 158.

Figure 5:
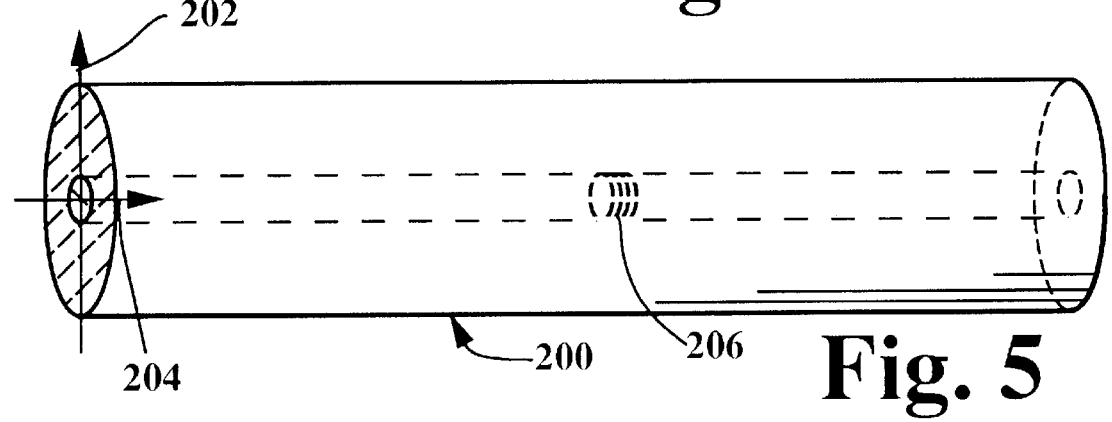
FIG. 5 shows a birefringent optical fiber, that may be polarization preserving fiber with a fiber gratings written onto its core.
Figure 6:
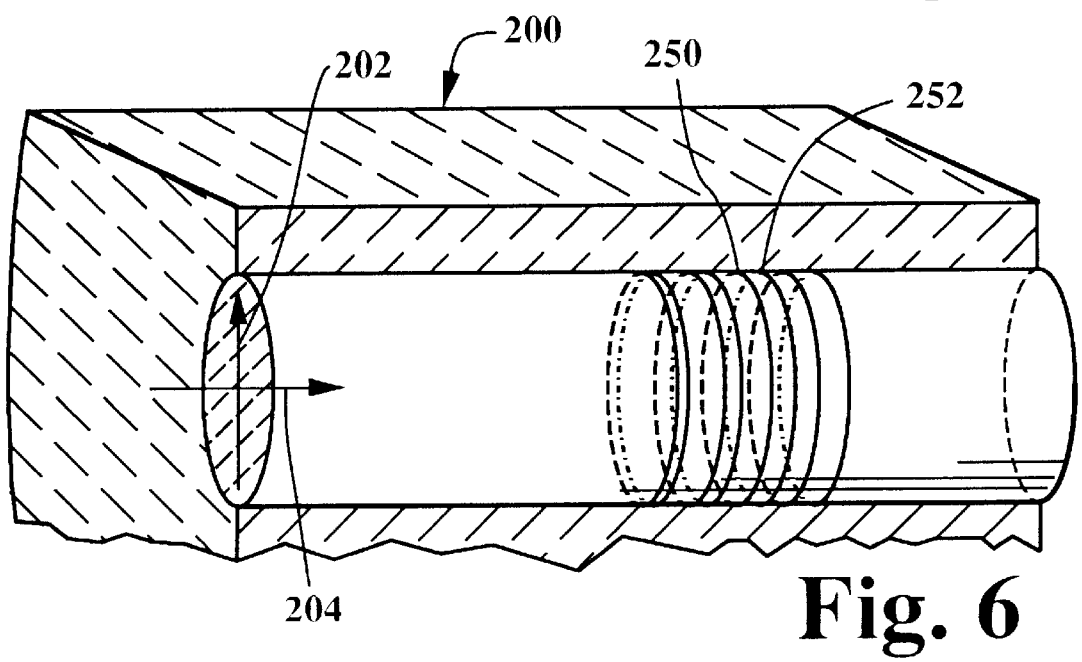
FIG. 6 shows a birefringent optical fiber, that may be polarization preserving fiber with dual overlaid fiber gratings written onto its core.

One disadvantage of using circularly symmetric single mode optical fiber is that for small transverse loads, the peak to peak separation may be extremely difficult to measure as the peaks may be buried in noise. To eliminate this problem, fiber gratings may be written into polarization preserving fiber 200, as shown in FIG. 5. Here the polarization preserving fiber 200 has two fiber axes 202 and 204 with different effective indices of refraction. When the fiber grating 206 is written onto the fiber 200, transverse stress results in two separated spectral peaks similar to FIG. 3B when interrogated by a demodulator 30. It is also possible to write dual overwritten fiber gratings 250 and 252 onto the polarization maintaining fiber 200 at separated wavelengths as shown in FIG. 6. This results in four effective fiber gratings and as described by Eric Udd in U.S. Pat. No. 5,591,965 that can be used to measure 3 axes of strain and temperature.

FIGS. 7A and 7B show the spectral reflection response from dual overwritten fiber gratings at 1300 and 1550 nm respectively written onto a polarization preserving optical fiber manufactured by the 3M Company. The peak to peak separation at 1300 nm is about 0.427 nm and the peak to peak separation at 1550 is about 0.488 nm. This separation is sufficient that the peaks are clearly discernible allowing accurate measurement of peak to peak separation necessary to determine transverse strain.

Figure 8A:
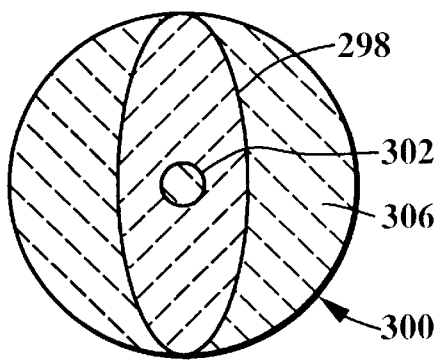
FIGS. 8A, 8B, 8C, 8D, 8E, 8F, and 8G show cross sections of various types of birefringent polarization preserving fiber.
Figure 8B:
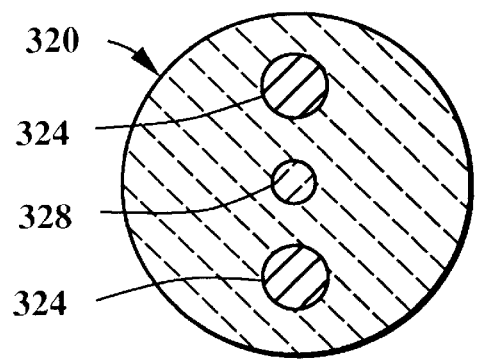
Figure 8C:
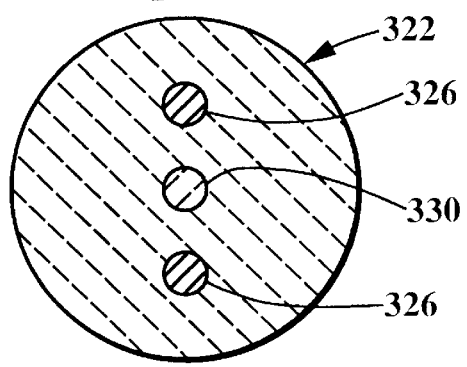
Figure 8D:
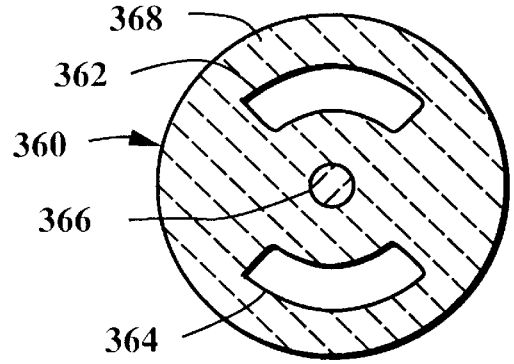
Figure 8E:
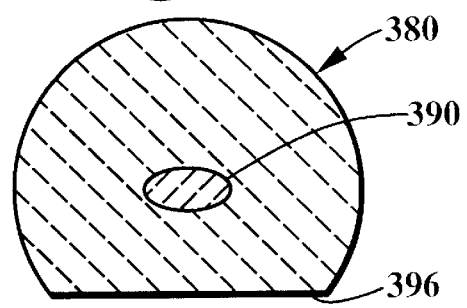
Figure 8F:
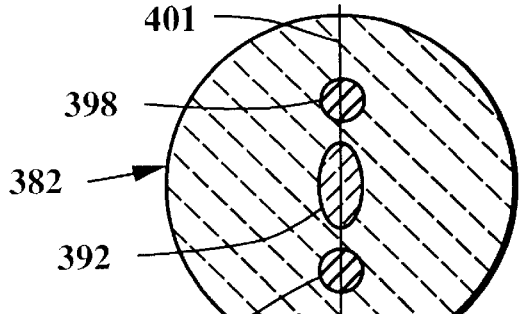
Figure 8G:
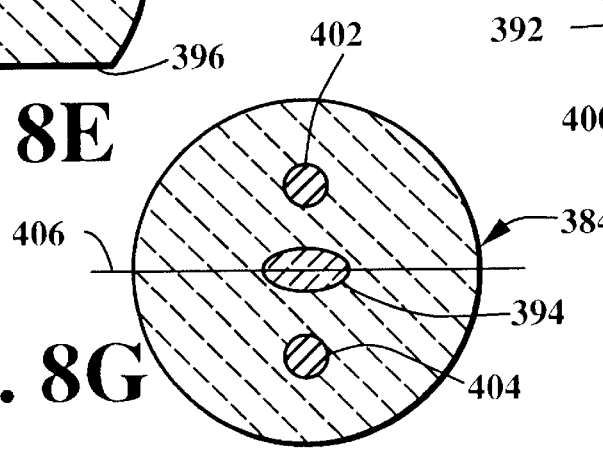

Fiber gratings have been written onto several different types of polarization maintaining fiber to determine suitability for transverse strain sensing including polarization preserving fibers made by 3M Each of these fibers have an elliptical cladding similar to the elliptical cladding 298 of the optical fiber 300 shown in cross section in FIG. 8A. Here the core 302 of the fiber 300 is surrounded by an elliptical cladding structure 298 constructed of glass that has a different hardness than the covering of glass 306 superposed on it to form the circularly symmetric optical fiber 300. Fujikura polarization maintaining optical fibers having a structure similar to that shown in the cross sections of optical fibers 320 and 322 of FIGS. 8B and 8C were also used. In the Fujikura fibers, stress rods 324 and 326 are used to induce a differential stress through the circularly symmetric fiber cores 328 and 330. The amount of stress induced can be controlled by changing the diameter of the stress rods as shown in FIGS. 8A and 8B as the difference in diameter between the stress rods 324 and 326. It can also be varied by changing the hardness of the surrounding glass relative to the hardness of the stress rods. Fiber gratings were written successfully onto the stress rod type of fiber although the orientation of the fiber to the light source and phase mask used to write the fiber grating had to be adjusted so that the stress rods did not mask the fiber core. A third type of fiber 360, as shown in FIG. 8D and supplied by Fibercore, had fiber gratings written on them for transverse strain measurements. Fibers 360 include soft glass side pits 362 and 364. This fiber 360 has stress induced across the circular core 366 caused by the difference in hardness between the side pits 362 and 364 and the glass 368 there about used to form a symmetric fiber 360. All of these fiber types demonstrated clear peak to peak separation suitable for transverse strain measurements as did elliptical core fibers 380, 382, and 384 supplied by Corning (FIG. 8E, 8F, and 8G). Fibers 380, 382 and 384 illustrate a series of optical fiber cross sections with elliptical cores 390, 392 and 394. While the Corning fibers tested had an elliptical core in a circular cladding, it is possible to adjust the cladding structure in ways that could serve to augment transverse strain sensitivity. The fiber 380 has a flat side 396, the fiber 382 had stress rods 398 and 400 that are oriented parallel to the major axis 401 of the elliptical core 392 while the fiber 384 has stress rods 402 and 404 that are oriented perpendicular to the major axis 406 of the elliptical core 394. It is also possible to have other geometrical shapes that may serve to augment transverse sensitivity.

Figure 9:
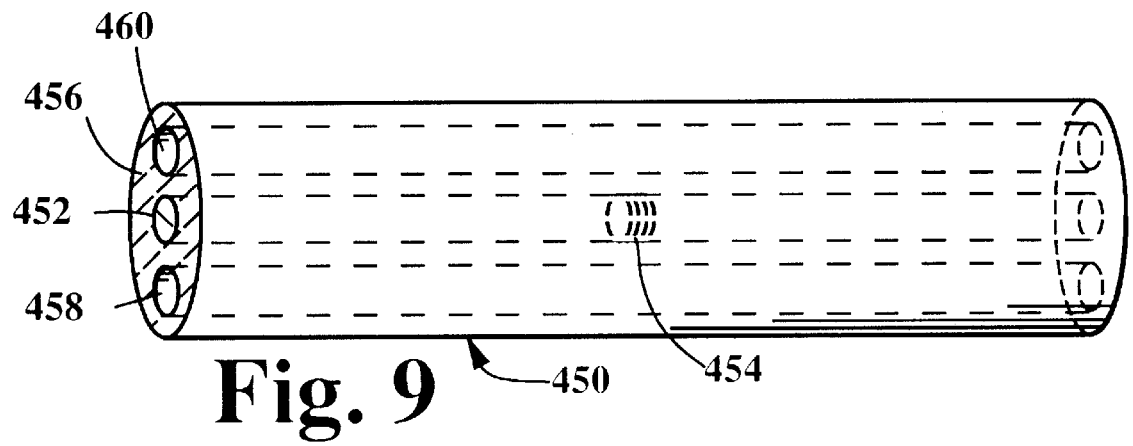
FIG. 9 shows a fiber grating based pressure sensor based on writing a fiber grating onto an optical fiber with air side holes.
Figure 10:
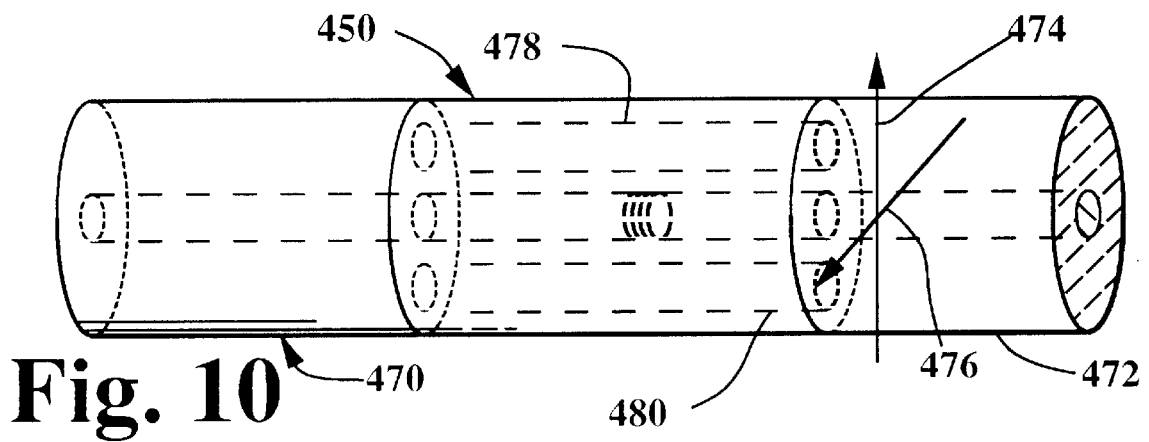
FIG. 10 illustrates a fiber grating based pressure sensor spliced between two lengths of optical fiber to seal the air holes.

One application of transverse strain sensors formed by writing fiber gratings into optical fibers is the measurement of pressure. FIG. 9 illustrates a fiber grating based pressure sensor 450. It consists of a fiber core 452 onto which a fiber grating 454 has been written. Contained within the cladding 456 of 450 are dual side holes 458 and 460 that may contain air or other gases and materials. The sensor 450 may be spliced into lengths of optical fiber 470 and 472 that may be single mode optical fiber as shown in FIG. 10. When outside pressure is applied to the sensor 450, it changes the birefringence of the fiber pressure sensor 450 along the principal axes 474 and 476. Sensitivity of the fiber pressure sensor 450 can be adjusted by altering the size and geometry of the side holes 478 and 480.

The fiber pressure sensor 450 can be multiplexed as is shown in FIG. 11. Here a fiber pressure sensor 500 with a fiber grating 502 centered about the wavelength $\lambda 1$ is spliced between the optical fiber segments 504 and 506. The segment 506 is in turn spliced to the fiber pressure sensor 508 with a fiber grating 510 centered about the wavelength $\lambda 2$. The optical fiber segment 512 is spliced between the other end of the fiber pressure sensor 508 and the fiber pressure sensor 514 with its fiber grating 516 centered about the wavelength λ3. The opposite end of the fiber pressure sensor 514 is spliced to the optical fiber segment 518. In this manner, a large number of fiber grating based pressure sensors can be spliced together and multiplexed using wavelength division multiplexing. It is also possible to use time division multiplexing techniques by using fiber grating based pressure sensors operating at similar wavelengths provided the reflectivity of the fiber gratings are less than 100% to avoid "shading" fiber grating pressure sensors that are farther from the light source.

FIG. 12 illustrates a system 550 of multiplexed fiber grating based pressure sensors 552, 554, and 556. A light source 558, that may be a broadband light source such as a light emitting diode or a tunable narrow band light source, may be used to couple a light beam 560 into the fiber end 562. The light beam 560 passes into the beamsplitter 564 where it is split into the light beams 566 and 568. The light beam 568 exits the system via the terminated end 570 (as an alternative the light beam 568 could be used to illuminate another set of fiber grating pressure sensors). The light beam 566 enters the fiber grating pressure sensor 552 and a portion of this light beam 566 is reflected off the fiber grating 572 as the light beam 574. The light beam 574 returns to the beamsplitter 564 and a portion of it is directed into the end of the beamsplitter 576 as the light beam 578. The light beam 578 then enters the spectral demodulator 580, that might be a scanning Fabry-Perot filter or acousto-optic tunable filter based system and outputs representative of the peak to peak separation due to pressure induced birefringence are read out as the output 582. This in turn may be interpreted to read out the pressure 584. The overall spectral shift of the profile depends on axial strain and temperature and this would be the readout 586.

Figure 13:
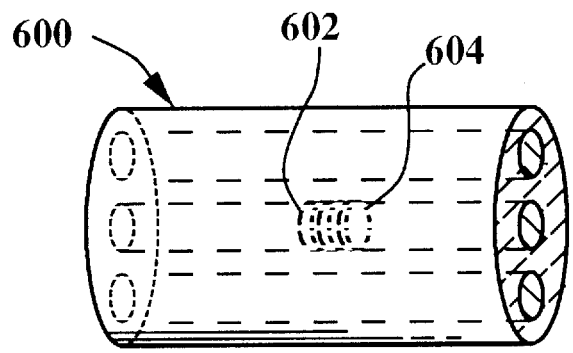
FIG. 13 shows a fiber grating based pressure sensor with dual overlaid fiber gratings written onto side hole fiber.

If axial strain is only due to pressure and not other types of loading a single fiber grating may be sufficient to determine strain and temperature. In general however, the presence of axial loading requires that the longitudinal induced strain be measured as well. This can be done by using dual overlaid fiber gratings as shown in FIG. 13. Here the fiber grating based pressure sensor 600 has a fiber grating 602 at wavelength λ1 that is overlaid with a second fiber grating 604 at wavelength λ2. This creates four effective fiber gratings that may be used to measure three axes of strain and temperature.

Figure 14:
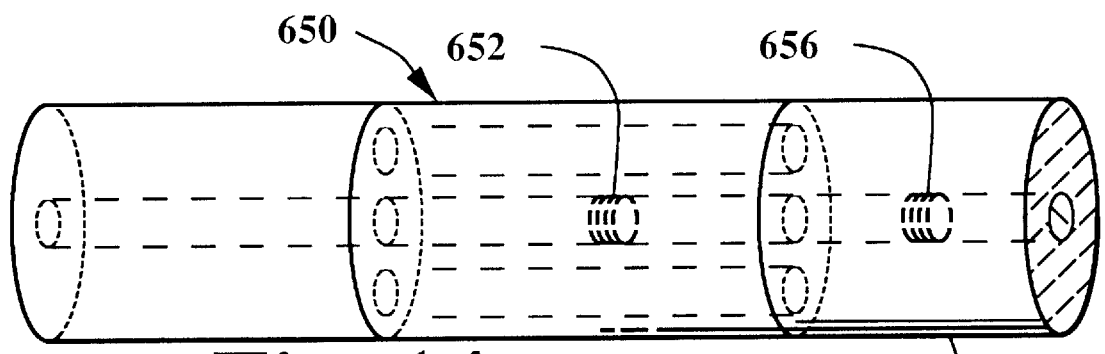
FIG. 14 is a diagram illustrating a fiber grating sensors that consists of a section of birefringent fiber that may be side hole fiber with a fiber grating written on it and a second fiber grating written onto another length of optical fiber to measure pressure and temperature.

An alternative approach is shown in FIG. 14. Here the fiber grating based pressure sensor 650 with a fiber grating 652 at wavelength λ1 is multiplexed with a second segment of circularly symmetric fiber 654 with a fiber grating 656 at wavelength λ2. The fiber grating 652 will respond differently to transverse strain than the fiber grating 656. In particular pressure induced birefringence will produce a measurable spectral peak to spectral peak separation in the reflected or transmitted signal from the fiber grating 652. The fiber grating 656 will however have a single peak with an overall spectral shift that depends on strain and temperature. By comparing the overall spectral shift (the average of the peak to peak separation for the fiber grating 652) of the fiber gratings 652 and 656 the strain and temperature may be measured. By writing the fiber gratings 652 and 656 on different types of optical fiber segments 650 and 654 the ease of inverting the two equations in the two unknowns of strain and temperature may be simplified by an additional degree of freedom. Note however, that such scheme is useful in environments where there is little, if any, short term temperature and strain fluctuations because the gratings 652 and 654 are not co-located.

It should be noted that while the side hole type of birefringent fiber was used to illustrate fiber grating based pressure sensors in FIGS. 9 through 14, other types of non-symmetric polarization preserving fibers such as those shown in FIG. 8 could have been used instead.

Figure 15:
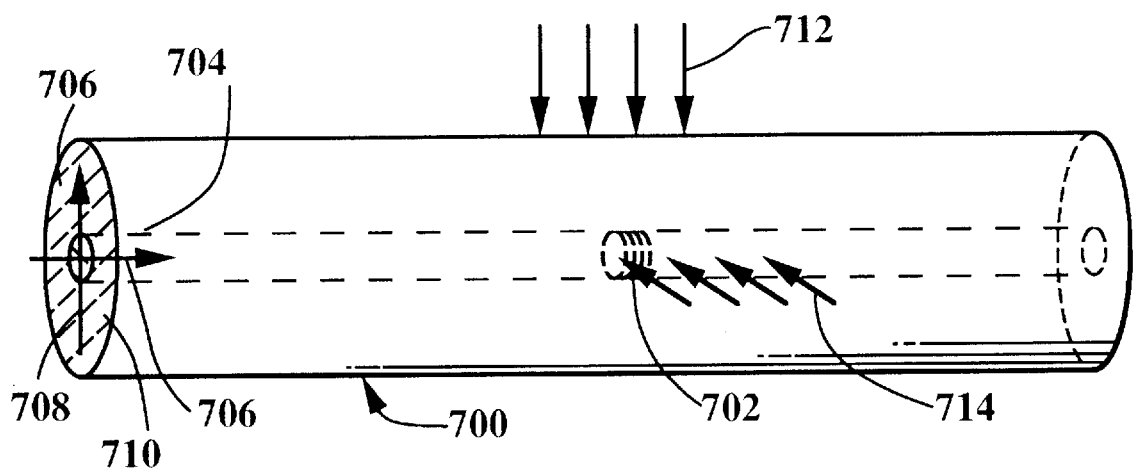
FIG. 15 is a diagram illustrating a birefringent fiber on which a fiber grating is written and to which transverse strain gradients are applied.

Another application of the transverse strain sensor is the measurement of transverse strain gradients. FIG. 15 shows a fiber grating based transverse strain sensor 700 based on birefringent optical fiber. A fiber grating 702 has been written onto the core 704 of the birefringent optical fiber 706 with principal axes 708 and 710. When transverse strain gradients 712 and 714 are applied along the axes 708 and 710, the result will be a change in the peak spectral profile as a result of the strain gradient.

Figure 16:
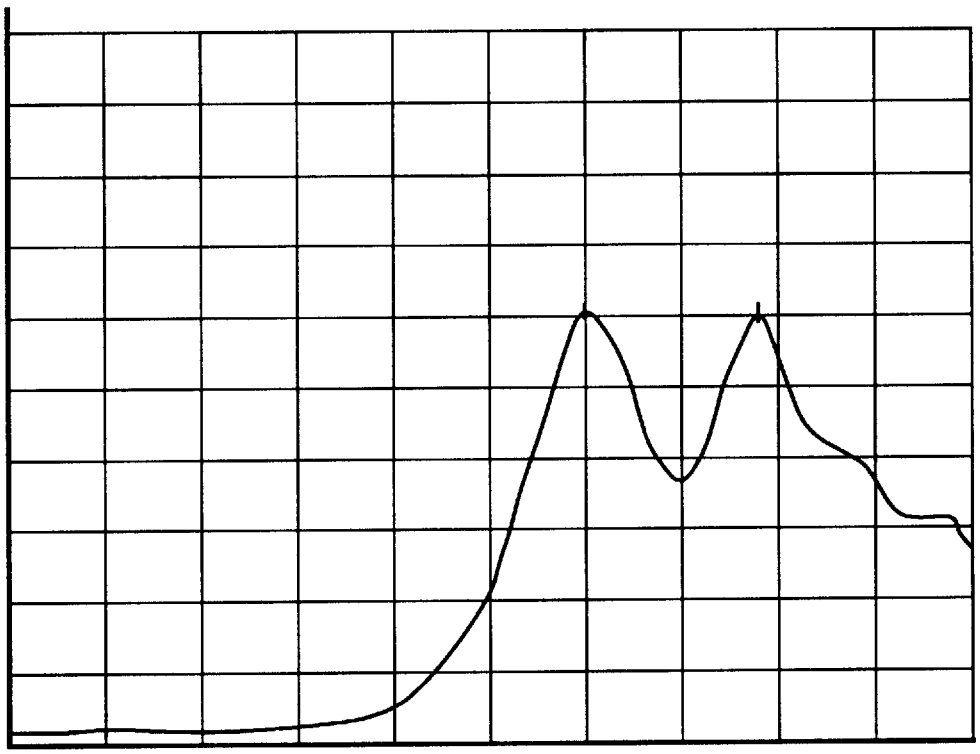
FIG. 16 is a diagram illustrating the reflected spectrum from a polarization preserving fiber with a fiber grating written onto it that has been embedded into a neat epoxy resin cylinder and subject to 300 pounds of loading applied via flat plates.
Figure 17:
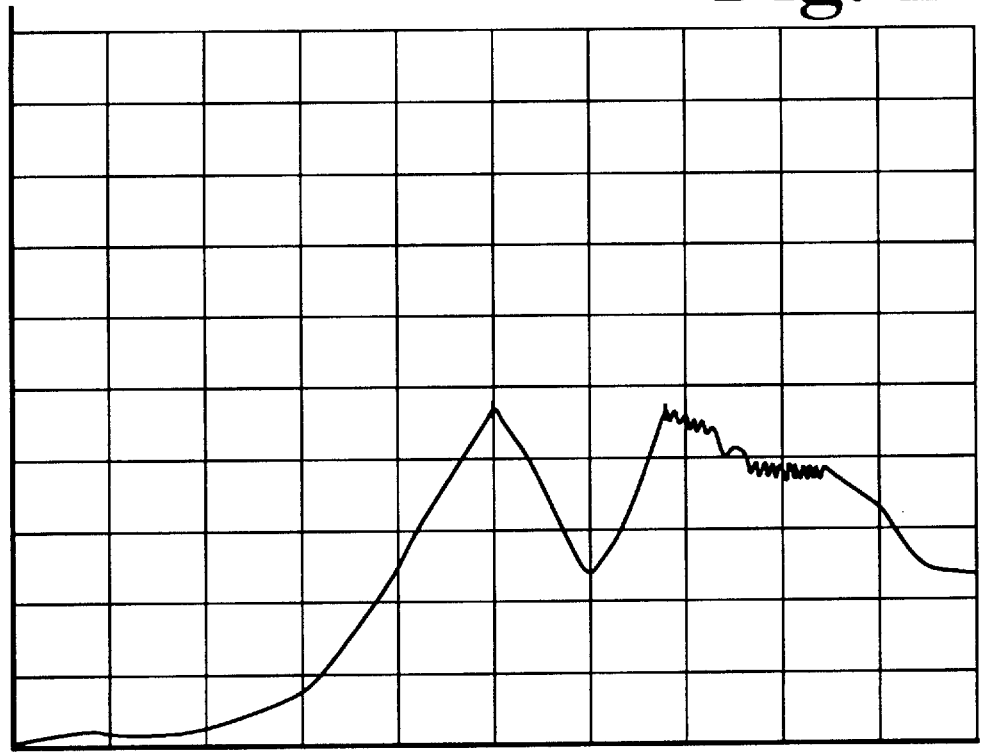
FIG. 17 is a diagram illustrating the reflected spectrum from a polarization preserving fiber with a fiber grating written onto it that has been embedded into a neat epoxy resin cylinder and subject to 400 pounds of loading applied via flat plates.
Figure 18:
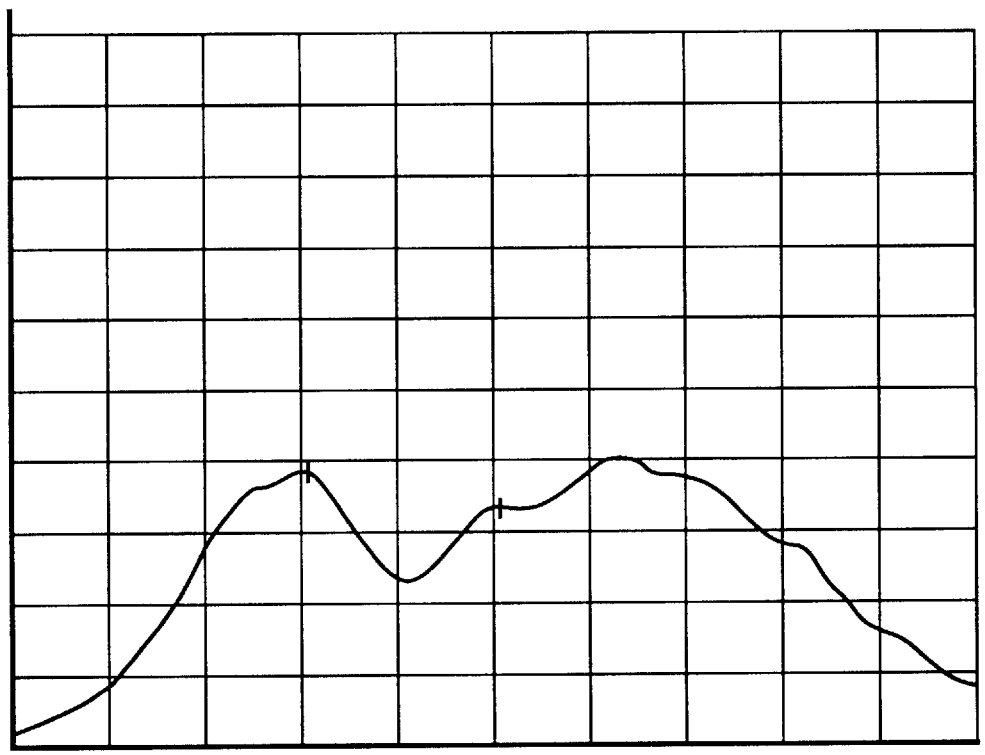
FIG. 18 is a diagram illustrating the reflected spectrum from a polarization preserving fiber with a fiber grating written onto it that has been embedded into a neat epoxy resin cylinder and subject to 450 pounds of loading applied via flat plates.

FIG. 16 shows the result of a Fibercore polarization preserving fiber with 1550 nm fiber grating written onto its core that was molded into a neat epoxy cylinder and transversely loaded with parallel flat plates at 300 pounds. Both peaks are clearly visible although some spreading of the reflected spectrum has occurred. FIG. 17 shows the resulting reflected spectrum at 400 pounds loading. The right hand peak corresponding to one of the transverse axes is beginning to spread widely due to transverse strain gradients while the other is still maintaining some of its original shape. FIG. 18 shows the result when 450 pounds of load are applied. In this case one of the transverse axes is showing considerable spreading due to transverse strain gradients while the other is just beginning to show substantial distortion. By measuring the width of this spreading as well as the intensity spectra it is possible to measure transverse strain gradients.

Figure 19:
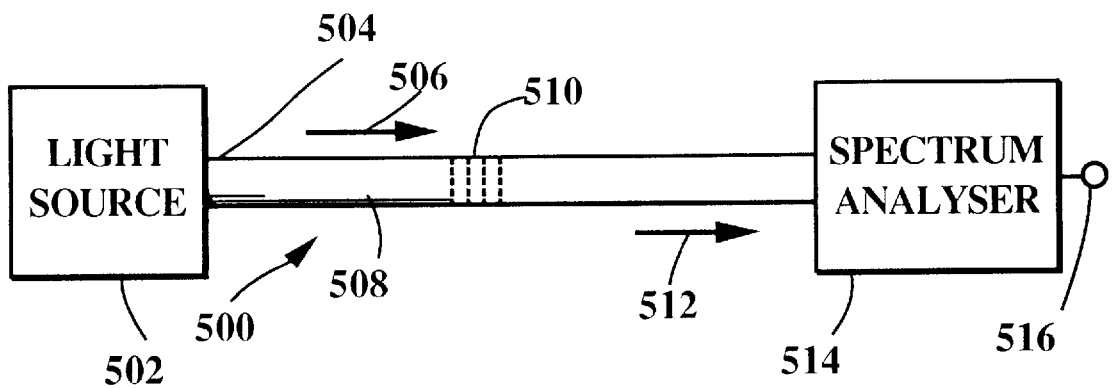
FIG. 19 is a diagram illustrating a test set to measure the spectral peaks of a fiber grating in transmission.

The inventions thus far described have all been described as operating in reflection. It is also possible to operate transverse strain sensors in transmission for the measurement of strain, pressure and strain gradients. FIG. 19 shows a basic configuration 500. A light source 502 that may be a broadband light source or a tunable narrow band source couples light into the fiber end 504 and generates a light beam 506 that propagates down the optical fiber 508. The light beam 506 propagates to one or more fiber gratings 510 written into the optical fiber 508. The optical fiber 508 in the region of the fiber gratings 510 may be birefringent and or geometrically shaped as described in association with the earlier figures. A portion of the light beam 506 passes through the fiber gratings 510 as the light beam 512 and is directed along the optical fiber 508 to the output spectrum analyzer/processor 514. The spectrum analyzer/processor 514 in turn generates the output 516 which may be indicative of transverse strain, pressure or strain gradients.

FIG. 20A and FIG. 20 B show the transmitted output spectra from a dual overlaid fiber grating transverse sensor using a configuration similar to that shown in FIG. 19. The light source used in this case consisted of edge emitting light emitting diodes operating at center wavelengths of 1300 and 1550 nm. These light sources could be used individually or combined into a single effective light source using a wavelength division multiplexing element. The fiber gratings corresponding to the data shown in FIGS. 20A and 20B were written at 1300 and 1550 nm in substantially the same position onto Fujikura polarization preserving optical fiber. FIG. 20A shows the peak to peak separation between the two transmission dips is about 0.320 nm at 1300 nm. FIG. 20B shows the peak to peak separation between the two transmission dips is about 0.406 nm at 1550 nm. As can be seen from FIGS. 20A and 20B operating in a transmission configuration similar to FIG. 19 also allows peak to peak measurements to be made to determine transverse strain, pressure or strain gradients in a manner similar to that described in association with the earlier FIGURES. One disadvantage of the transmission approach associated with FIG. 19 as opposed to using reflection configuration described with the earlier FIGURES is that it requires access to both ends of the transverse fiber sensor. In some applications this could add substantial cost especially when there is a considerable distance between the sensing region and the area where information is to be processed.

Thus there has be shown and described novel transverse strain sensors that may be used to measure pressure, temperature and transverse strain gradients and fulfill all the objects and advantages sought therefor. Many changes, modifications, variations, uses and applications of the subject invention will however become apparent to those skilled in the art after considering the specification and the accompanying drawings. All such changes, modifications, alterations and other uses and applications which do not depart from the spirit and scope of the invention are deemed to be covered by the invention which is limited only by the claims that follow.

What is claimed is:

1. A system to sense the transverse stress in an optical fiber including:
   a source of light for producing a first light beam;
   a beamsplitter connected to receive the first light beam from said light source and split it into second and third light beams;
   a optical fiber connected to receive the second light beam from the beamsplitter, said optical fiber having:
      a first optical grating formed therein for exposure to the transverse stress for reflecting a portion of the second light beam as a fourth light beam having two maximums of spectral intensity whose spectral spacing varies with the transverse stress applied to said optical fiber at said first optical grating; and
   a detector to measure the spectral spacing of the two maximums of spectral intensity and to produce a first output representative of the transverse stress in said optical fiber.

2. The system as defined in claim 1 wherein said detector is connected to said beamsplitter to receive a portion of the fourth light beam.

3. The system as defined in claim 1 wherein said optical fiber is a birefringent optical fiber having asymmetrical physical response to pressure applied there about, whereby the first output representative of the transverse stress is representative of pressure applied to said birefringent optical fiber at said first optical grating.

4. The system as defined in claim 1 wherein said detector measures the spectral spacing of the two maximums of spectral intensity to produce the first output representative of the transverse stress applied to said optical fiber at the first optical grating.

5. The system as defined in claim 1 wherein said detector measures the spectral spread of at least one of the two maximums of spectral intensity and produces the first output representative of any transverse stain gradient applied to said optical fiber at said first optical grating.

6. The system as defined in claim 1 wherein said first optical grating has:
   a first grating spacing so said first optical grating reflects a first portion of the second light beam about a first frequency, said optical fiber further including:
      a second optical grating co-located with said first optical grating for exposure to transverse stress for reflecting a second portion of the second light beam as a fifth light beam having two maximums of spectral intensity whose spectral spacing varies with the transverse stress applied to said optical fiber at said second optical grating, said second optical grating having:
   a second grating spacing different from said first grating spacing so said second optical grating reflects the second portion of the second light beam about a second frequency different from the first frequency.

7. The system as defined in claim 1 wherein said first optical grating has:
   a first grating spacing so said first optical grating reflects a first portion of the second light beam about a first frequency as the fourth light beam, said optical fiber further including:
      a second optical grating spaced from said first optical grating for exposure to transverse stress for reflecting a second portion of the second light beam as a fifth light beam having two maximums of spectral intensity whose spectral spacing varies with the transverse stress applied to said second optical grating, said second optical grating having;
   a second grating spacing different from said first grating spacing so said second optical grating reflects the second portion of the second light beam about a second frequency different from the first frequency.

8. The system as defined in claim 7 wherein said detector measures the two maximums of spectral intensity in the fourth and fifth light beams to produce the first output representative of the two maximums of spectral intensity in the fourth light beam and a second output representative of the two maximums of spectral intensity in the fifth light beam.

9. The system as defined in claim 1 wherein said optical fiber is a first birefringent optical fiber having asymmetrical physical response to pressure applied there about, and whereby the first output representative of the transverse stress is representative of pressure applied thereto, said first optical grating having:
   a first grating spacing so it reflects a first portion of the second light beam about a first frequency, said system further including:
   a second birefringent optical fiber connected to said first birefringent optical fiber having asymmetrical physical response to pressure applied there about, said second birefringent optical fiber having:
      a second optical grating for exposure to transverse stress for reflecting a second portion of the second light beam as a fifth light beam having two maximums of spectral intensity whose spectral spacing varies with the transverse stress applied to said second optical grating, said second optical grating having:
         a second grating spacing different from said first grating spacing so said second optical grating reflects the second portion of said second light beam about a second frequency different from the first frequency.

10. The system as defined in claim 9 wherein said first birefringent optical fiber is connected to said second birefringent optical fiber by a non-birefringent optical fiber.

11. A method to sense the application of transverse stress to an optical fiber having an optical grating written thereon including:
   producing a first light beam;

impinging the first light beam on the optical grating when transverse stress is being applied thereto to produce a reflection of a portion of the first light beam having two maximums of spectral intensity whose spectral spacing varies with the transverse stress applied to the optical fiber at the first optical grating;

detecting the two maximums of spectral intensity; and producing from the two detected maximums of spectral intensity a first output representative of the transverse stress applied to the optical fiber.

12. The method as defined in claim 11 wherein said detecting the two maximums of spectral intensity includes:

detecting the spacing between the two maximums of spectral intensity, and wherein the producing of a first output representative of the two maximums of spectral intensity includes:

producing a first output representative of the spacing of the two maximums of spectral intensity.

13. The method as defined in claim 12 wherein the optical fiber is a birefringent optical fiber, pressure applied to the birefringent optical fiber at the optical grating causing transverse stress to the optical grating, and wherein the producing of a first output representative of the two maximums of spectral intensity includes:

producing a first output representative of the pressure applied to the birefringent optical fiber at the optical grating.

14. The method as defined in claim 12 wherein the optical grating is the first optical grating reflecting a first spectrum, and the optical fiber is a birefringent optical fiber that includes a second optical grating which reflects a second spectrum different from the first spectrum, pressure applied to the birefringent optical fiber at the second optical grating causing transverse stress to the second optical grating, wherein the producing of a first output representative of the two maximums of spectral intensity includes:

producing a first output representative of the pressure applied to the birefringent optical fiber at the first optical grating and the temperature thereof, and producing a second output representative of the pressure applied to the birefringent optical fiber at the second optical grating and the temperature thereof so that pressure and temperature can be derived from the first and second outputs.

15. The method as defined in claim 14 wherein the first and second optical gratings are co-located.

16. The method as defined in claim 14 wherein the first and second optical gratings are located so they are exposed to essentially the same pressure and temperature.

17. The method as defined in claim 11 wherein the optical fiber is a non-birefringent optical fiber, strain gradients applied about the non-birefringent optical fiber at the optical grating causing transverse stress to the optical grating that spectrum spreads at least one of the two maximums of spectral intensity, wherein the producing a first output representative of the two maximums of spectral intensity includes:

producing a first output representative of the strain gradient applied about the non-birefringent optical fiber at the optical grating.

18. A system to sense the application of pressure including:

a source of light for producing a first light beam;

a birefringent optical fiber connected to receive the first light beam, said birefringent optical fiber having:

a first optical grating formed therein for exposure to the transverse stress caused by pressure applied to said birefringent optical fiber, said first optical grating being for reflecting a first portion of the first light beam as a second light beam having two maximums of spectral intensity, the spectral spacing of the maximums of spectral intensity varying with the pressure applied to said birefringent optical fiber at said first optical grating; and a detector to measure the two maximums of spectral intensity of the second light beam and to produce a first output representative of the pressure applied said birefringent optical fiber.

19. The system as defined in claim 18 wherein said detector measures the spacing of the two maximums of spectral intensity of the second light beam and produces a first output representative of the pressure applied to the first optical grating therefrom.

20. The system as defined in claim 18 wherein said birefringent optical fiber further includes:

a second optical grating formed therein for exposure to the transverse stress caused by pressure applied to said birefringent optical fiber and the temperature thereof, said second optical grating being for reflecting a second portion of the first light beam at different frequencies than the first portion as a third light beam having two maximums of spectral intensity, the spectral spacing of the maximums of spectral intensity of the third light beam varying with the pressure applied to said birefringent optical fiber at said second optical grating and the temperature thereof, wherein said detector also measures the spacing of the two maximums of spectral intensity of the third light beam and produces a second output representative of the pressure applied to said second optical grating and the temperature thereof.

21. A system to sense transverse strain in an optical fiber including:

a source for producing a first light beam;

a optical fiber connected to receive the first light beam from said light source said optical fiber having:

a first optical grating formed therein for exposure to the transverse stress for transmitting a portion of said first light beam as a second light beam having two minimums of spectral intensity whose spectral spacing varies with the transverse applied stress applied to said optical fiber at said first optical grating; and a detector to measure the two spectral minimums of spectral intensity and to produce a first output representative of the spectral spacing thereof.

22. The system as defined in claim 21 wherein said optical fiber is a birefringent optical fiber having asymmetrical physical response to pressure applied there about, whereby the first output representative of the transverse stress is representative of pressure applied to said birefringent optical fiber at said first optical grating.

23. The system as defined in claim 21 wherein said first optical grating has:

a first grating spacing so said first optical grating transmits a portion of the first light beam about a first frequency, said optical fiber further including:

a second optical grating co-located with said first optical grating for exposure to transverse stress for transmitting a second portion of the first light beam as a third light beam having two minimums of spectral intensity whose spectral spacing varies with the transverse stress applied to said optical fiber at said second optical grating, said second optical grating having:

a second grating spacing different from said first grating spacing so said second optical grating transmits the second portion of the second light beam about a second frequency different from the first frequency.

24. The system as defined in claim 21 wherein said first optical grating has:

a first grating spacing so said first optical grating transmits a first portion of the first light beam about a first frequency as a third light beam, said optical fiber further including:

a second optical grating spaced from said first optical grating for exposure to transverse stress for transmitting a second portion of the first light beam as a fourth light beam having two minimums of spectral intensity whose spectral spacing varies with the transverse stress applied to said second optical grating, said second optical grating having:

a second grating spacing different from said first grating spacing so said second optical grating reflects the second portion of the second light beam about a second frequency different from the first frequency.

25. The system as defined in claim 24 wherein said detector measures the two maximums of spectral intensity in the third and fourth light beams to produce the first output representative of the two maximums of spectral intensity in the third light beam and a second output representative of the two maximums of spectral intensity in the fourth light beam.

* * * * *